Aug. 8, 1933.   H. R. WEST   1,921,713
ELECTRICAL COMPENSATING ARRANGEMENT
Filed June 8, 1931
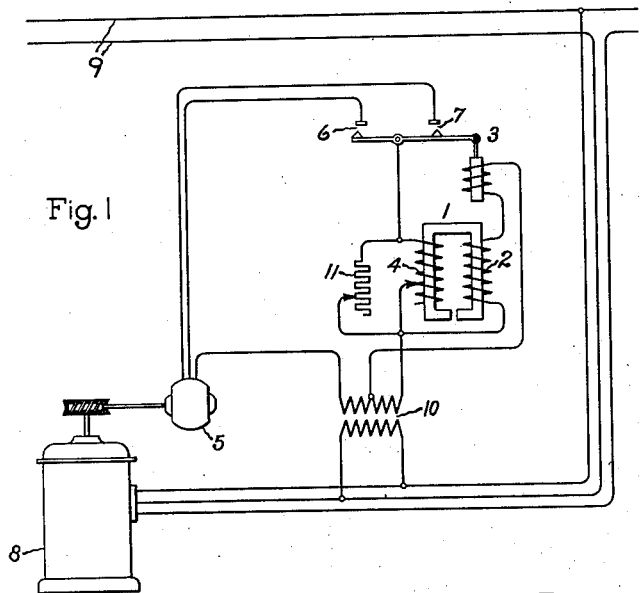
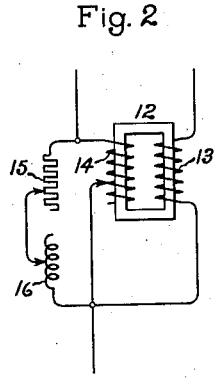
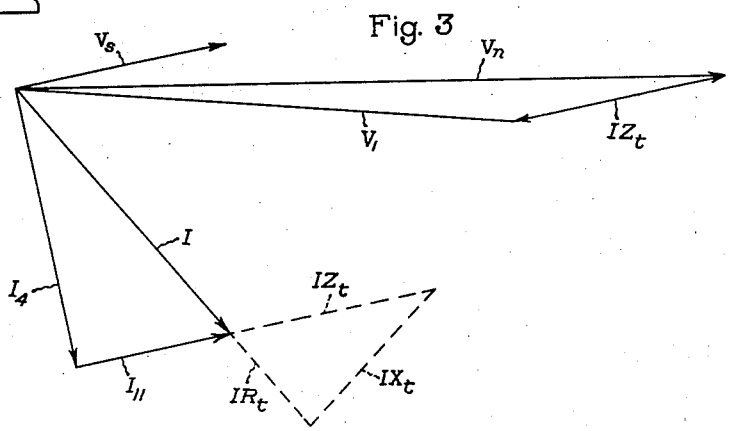
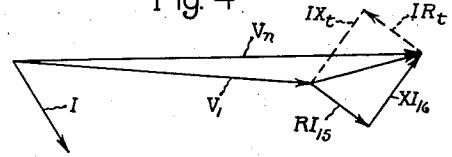
Inventor:
Harry R. West,
by Charles E. Mullen
His Attorney.

Patented Aug. 8, 1933

1,921,713

UNITED STATES PATENT OFFICE 1,921,713

ELECTRICAL COMPENSATING ARRANGEMENT

Harry R. West, Pittsfield, Mass., assignor to General Electric Company, a Corporation of New York Application June 8, 1931. Serial No. 542,866

3 Claims. (Cl. 171—119)

My invention relates to electrical compensating arrangements and particularly to arrangements for compensating voltage stabilizers for errors produced by variable power factor loads.

It has been proposed to use a voltage stabilizer in connection with a control circuit and a power circuit which are both energized from the same source. It has also been proposed to use this stabilizer in connection with the contact making voltmeter control circuit and the servo motor energizing power circuit of a feeder voltage regulator control system in which both of these circuits are energized from the same supply transformer. In its preferred form, the stabilizer is a transformer whose secondary winding is arranged to produce in the contact making voltmeter control circuit a corrective voltage which varies with the voltage drop in the transformer which is produced by the relatively heavy current in the power circuit.

The compensation, or correction, produced by the above-mentioned arrangement is only complete at one value of power factor of the motor. However, the motor power factor varies considerably over its operating range and consequently objectionable voltage variations occur in the contact making voltmeter control circuit.

In another application, Serial No. 542,843, filed June 8, 1931, in the name of F. J. Champlin, and assigned to the assignee of the present application, there are disclosed and broadly claimed various arrangements for compensating the stabilizer and controlling the phase angle of its voltage so that the action of the stabilizer is materially improved over the range of motor power factor for which it is designed to correct. In my present application, I disclose additional stabilizer compensating arrangements.

An object of my invention is to provide new and improved voltage stabilizer compensating means.

My invention will be better understood from the following description, taken in connection with the accompanying drawing, and its scope will be pointed out in the appended claims.

In the drawing, Fig. 1 illustrates diagrammatically an embodiment of my invention in which the stabilizing transformer has a relatively large leakage reactance and large exciting current or low magnetizing reactance; Fig. 2 illustrates a modified arrangement in which the transformer has a low leakage reactance and low exciting current or high magnetizing reactance, while Figs. 3 and 4 are vector diagrams for illustrating respectively the operation of Figs. 1 and 2.

Referring now to Fig. 1 of the drawing, 1 is the voltage stabilizing transformer whose secondary winding 2 is connected in the control circuit of a contact-making voltmeter 3, and whose primary winding 4 is connected in the circuit of a servo motor 5 which is controlled through contacts 6 and 7 of voltmeter 3. Motor 5 is mechanically connected in the usual manner to a feeder voltage regulator, such as an induction feeder voltage regulator 8, which is connected to regulate the voltage of a feeder circuit 9. A supply transformer 10 is connected for energizing the control and power circuits of the system. For adjusting the phase of the secondary winding voltage of the stabilizing transformer, I employ an adjustable resistive impedance 11 connected in parallel with the primary winding 4 of the stabilizer.

Stabilizing transformer 1 is what is usually referred to as a reactance transformer in that it has a relatively high exciting current and leakage reactance. One way of obtaining such a transformer is to provide its core with an air gap and have its windings relatively widely separated. In the operation of this embodiment of my invention, resistance 11 is so adjusted with relation to the reactance of stabilizer 1 that the ratio of this resistance to the reactance of the stabilizer is inversely proportional to the ratio of the resistance and reactance of supply transformer 10.

The arrangement of contact-making voltmeter 3 is such that with normal voltage on feeder circuit 1, both contacts 6 and 7 are open so that motor 5 is deenergized. However, upon a variation from normal of the voltage of circuit 9, contact-making voltmeter 3 will cause the closure of either contacts 6 or contacts 7, thereby energizing motor 5 in such a way that its direction of rotation causes regulator 8 to restore the voltage to normal. During this operation of motor 5, the stabilizer 1 acts to produce a voltage in the control circuit of the contact-making voltmeter which tends to compensate for the impedance voltage drop in transformer 10 which is caused by the relatively heavy current supplied to motor 5. If the power factor of motor 5 remains constant throughout its range of operation, additional compensating means would be unnecessary because in that case the effective value of the impedance drop in transformer 10 would be directly proportional to the magnitude of the motor current, and this could be compensated for by a proper turn ratio in the stabilizing transformer. However, unless additional means are provided for making the corrective voltage of the stabilizer 1 in phase opposition with the impedance voltage drop in transformer 10, correct compensation will not be attained during variations in motor power factor.

Fig. 3 illustrates vectorially how I attain this corrected compensation by means of the arrangement illustrated in Fig. 1. In this figure, $V_n$ is the normal output voltage of transformer 10 when the contact-making voltmeter 3 is balanced. I is the motor current, which has a low power factor during most of the motor's operation. $IR_t$ and $IX_t$ are the resistance and reactance voltage drops in transformer 10 caused by current I and which combine to produce $IZ_t$, the impedance drop in this transformer. This voltage drop $IZ_t$, when subtracted vectorially from $V_n$, gives the vector $V_1$ which is the output voltage of transformer 10 at a time when the motor current is high. The current I is made up of two components $I_{11}$ which is the current flowing in resistance 11, and $I_4$ which is the current flowing in the primary winding 4 of stabilizer 1. Due to the inverse relation between the ratios of the resistance 11 to the reactance of transformer 1 and of the resistance to the reactance of transformer 10, the current in resistance 11 will be in phase with the impedance drop of transformer 10. The result of this arrangement is that as the voltage drop in resistance 11 will be in phase with the current through it and as this voltage drop must equal the voltage impressed on the stabilizer, it follows that the voltage of the secondary winding of the stabilizer will be in phase with the impedance drop in transformer 10. This stabilizer voltage is shown at $V_s$. By providing the stabilizer with the proper number of turns, this voltage $V_s$ may be made to equal the impedance drop $IZ_t$. As shown, this arrangement results in a substantially complete compensation which is independent of the power factor of motor 5.

In the arrangement illustrated in Fig. 2, the stabilizer 12 has a small exciting current and its primary winding 14 is shunted by a variable resistance 15 and a variable reactance 16. By making the ratio of the value of resistance 15 to the value of reactance 16 in ohms proportional to the resistance and reactance of transformer 10, substantially complete compensation may be achieved, as shown in Fig. 4. In this figure, $IR_t$ and $IX_t$ are the resistance reactance drops in transformer 10, which together produce the impedance drop in the transformer which reduces the voltage of transformer 10 from $V_n$ to $V_1$ when current I is flowing. $RI_{15}$ and $XI_{16}$ are the voltage drops in resistance 15 and reactance 16, when referred to the secondary side of the stabilizer, and which, as shown, are equal respectively to the resistance and reactance drops in transformer 10. By suitably choosing the turn ratio of the stabilizer 12, these drops may be made to produce a compensating voltage which completely compensates the contact-making voltmeter-control circuit during changes in power factor of the motor.

While I have shown and described particular embodiments of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is,—

1. The combination with a supply transformer, of a power circuit, and a control circuit energized therefrom, a voltage stabilizing transformer having its primary winding connected in said power circuit and its secondary winding connected in said control circuit, said stabilizing transformer having an abnormally high exciting current and an impedance connected in parallel with the primary winding of said stabilizing transformer.

2. The combination with a supply transformer, of a power circuit, and a control circuit energized therefrom, a voltage stabilizing transformer having its primary winding connected in said power circuit and its secondary winding connected in said control circuit, said stabilizing transformer having a relatively high reactance, a resistance connected in parallel with the primary winding of said stabilizing transformer, the ratio of said resistance to the reactance of said stabilizing transformer being inversely proportional to the ratio of the resistance of said supply transformer to its reactance.

3. The combination with a supply transformer, of a power circuit, and a control circuit energized therefrom, a relatively low exciting current voltage stabilizing transformer having its primary winding in said power circuit and its secondary winding in said control circuit, an impedance connected in parallel with the primary winding of said stabilizing transformer, said impedance having a ratio of resistance to reactance which is directly proportional to the ratio of resistance to reactance of said supply transformer.

HARRY R. WEST.